United States Patent [19]
Greig

[11] 4,077,597
[45] Mar. 7, 1978

[54] MIRROR

[76] Inventor: William Joseph Greig, 17 Sycamore St., Mentone, Victoria, Australia, 3194

[21] Appl. No.: 652,336

[22] Filed: Jan. 26, 1976

[30] Foreign Application Priority Data

Jan. 13, 1976 Australia .............................. 4509/76

[51] Int. Cl.² ............................................. A47G 1/24
[52] U.S. Cl. .................................. 248/477; 248/479; 248/289 R; 403/94
[58] Field of Search ............... 248/456, 477, 478, 479, 248/480, 496, 282, 289; 16/146

[56] References Cited

U.S. PATENT DOCUMENTS

| | | | |
|---|---|---|---|
| 1,113,034 | 10/1914 | Miller | 248/456 |
| 2,783,015 | 2/1957 | Kampa | 248/480 |
| 2,827,255 | 3/1958 | Kampa | 248/289 |
| 2,969,715 | 1/1961 | Mosby | 248/478 |
| 3,306,565 | 2/1967 | Beach | 248/282 |
| 3,339,876 | 9/1967 | Kampa | 248/478 |
| 3,346,229 | 10/1967 | Carson | 248/477 |
| 3,371,903 | 3/1968 | Thompson | 248/282 |
| 3,384,334 | 5/1968 | Malachowski | 248/478 |
| 3,421,728 | 1/1969 | Gordon | 248/477 |
| 3,637,186 | 1/1972 | Greenfield | 248/289 |

*Primary Examiner*—Robert Hafer
*Attorney, Agent, or Firm*—Lowe, King, Price & Markva

[57] ABSTRACT

A mirror for use in automobiles using a support frame of approximate C-shape and having a mirror support spring also supporting the support frame, the mirror support spring preventing the mirror from moving due to motion or vibrations of the automobile.

9 Claims, 3 Drawing Figures

U.S. Patent     March 7, 1978     4,077,597
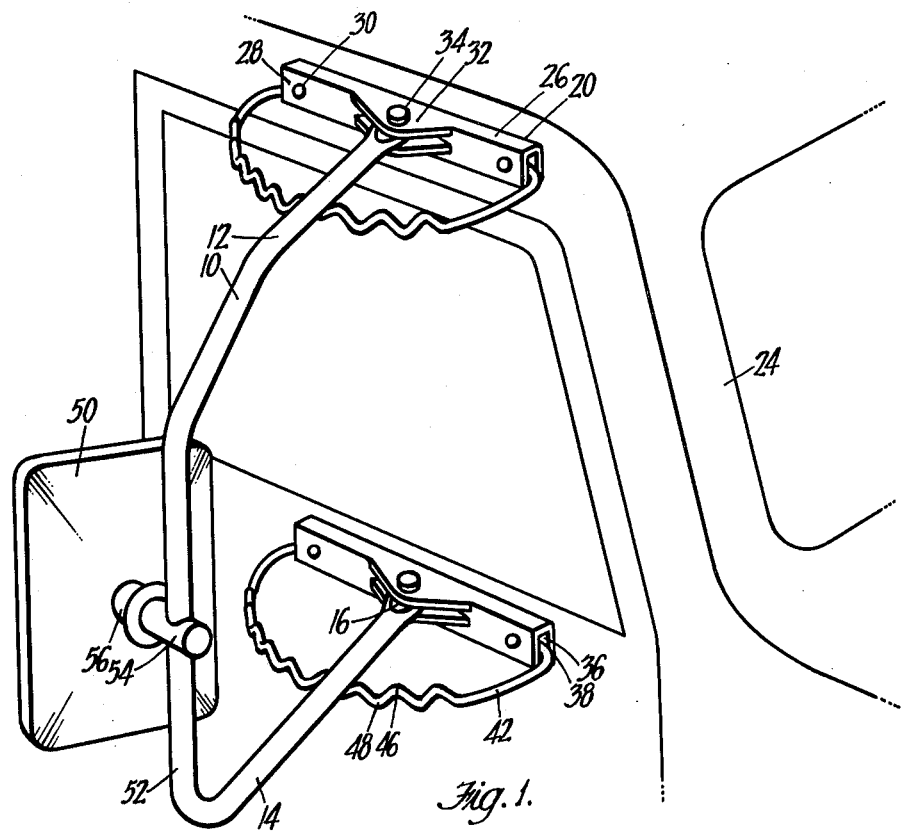
Fig. 1.
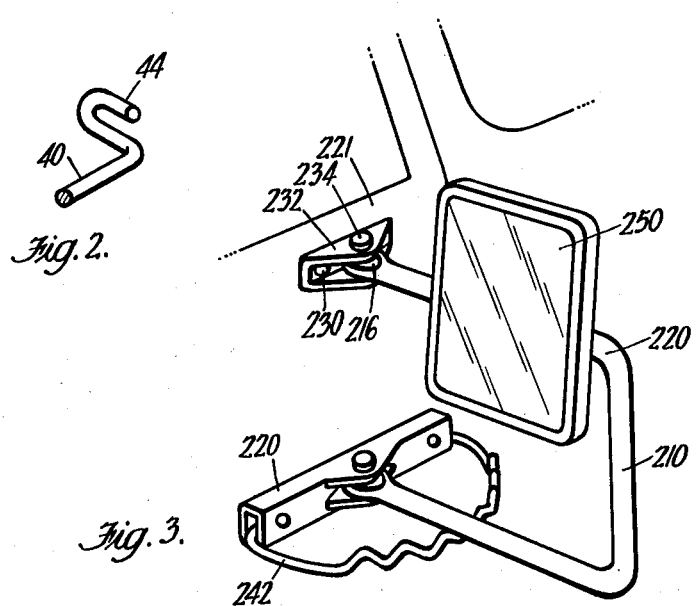
Fig. 2.
Fig. 3.

MIRROR

BACKGROUND OF THE INVENTION

This invention relates to mirrors and refers particularly, though not exclusively, to an externally mounted mirror for use on larger automobiles.

It has long been a problem with larger vehicles requiring externally mounted rear vision mirrors that the mirror would be shaken out of alignment due to the mirror support frame moving as the vehicle travelled over rough or uneven surfaces. Thus it has previously been found necessary to provide braces to keep the mirror support frame in position. This has meant it has been impossible to have a "break-away" mechanism to prevent damage to the mirror and/or frame when hit by a solid object.

Many proposals have been put forward to provide a break-away yet vibration proof mirror and support frame including torsional springs, ratchets, tightening mechanisms and so forth but these have proved ineffective and clumsy.

It is therefore a principal object of the present invention to provide a mirror that is effective in operation and is easily used.

A further object of the present invention to provide a mirror that is easily and relatively inexpensively manufactured.

Another object of the present invention is to provide a mirror support frame that has increased support.

SUMMARY OF THE INVENTION

With the above and other objects in mind the present invention provides a mirror comprising a mirror support frame pivotally connected to an upper attachment means and a lower attachment means, the lower attachment means having extending outwardly therefrom a mirror support spring having at least one crimp therein to releasable receive therein an arm of the mirror support frame.

In order that the invention may be clearly understood and readily put into practical effect there will now be described a preferred construction of a mirror according to the present invention by way of example only and with reference to the accompanying drawings.

DESCRIPTION OF DRAWINGS

FIG. 1 is a front perspective view of a first embodiment of the present invention fitted to a vehicle;

FIG. 2 is a detail view of one end of the mirror support means of FIG. 1; and

FIG. 3 is a rear perspective view of a second embodiment of the present invention fitted to a vehicle.

DESCRIPTION OF PREFERRED CONSTRUCTIONS

The standard mirror support frame of a truck, bus, tram or the like is normally C-shaped when the left-hand-side mirror (viewed from the front of the vehicle) is considered. The present invention utilizes a similar tubular mirror support frame 10 with the two outwardly extending arms 12, 14 of the frame 10 being substantially horizontal. At the outermost or open end of each of the arms 12, 14 of the mirror support frame 10 there is provided a flattened portion 16 having a hole therethrough to enable the entire mirror support frame 10 to be pivotally connected to upper and lower attachment means 20 which are securably mountable to the vehicle body 24.

The upper and lower attachment means 20 are in the form of an elongate member 26 having transverse holes 28 at each end thereof to enable it to be secured to the vehicle body 24 by means of bolts 30 or the like. Intermediate its length, the upper and lower attachment means 20 have an outwardly extending U-shaped bracket 32 adapted to receive the flattened portion 16 of the upper arm 12 and lower arm 14 respectively of the mirror support frame 10 in pivotally secured relationship by means of a bolt and nut, rivet, or the like 34.

At each end of the upper and lower attachment means 20 there are provided retaining sockets 36 with the openings 38 thereof extending outwardly therefrom for retaining therein the ends 40 of mirror support springs 42. The mirror support springs 42 are preferably made of heavy gauge stainless steel wire extending in an arcuate fashion for approximately 180°. Each end 40 of the mirror support springs 42 is provided with a radially inwardly directed loop 44 which is securely held within the sockets 36 by the bolts 30 or the like which secure the upper and lower attachment means 20 to the vehicle body 24. At a predetermined number of locations, the mirror support springs are crimped to form a number of M-shaped or wave-shaped crimps 46 into which the upper and lower arms 12, 14 are located.

Thus, in use, as the upper and lower arms 12, 14 of the mirror support frame 10 rest in the valleys 48 of the M-shaped crimps 46, the mirror support frame 10 cannot be moved by vehicular vibration alone. However, if contacted by a solid object, the springing nature of the mirror support springs 42 means that the arms 12, 14 of the mirror support frame 10 would be forced out of the valley 48 of the M-shaped crimps 46 of the mirror support springs 42 and would thus be free to move to a non-contacting position.

The crimps 46 would be provided at selected locations so the one mirror support frame 10 and upper and lower attachment means 20 could be used on either side of the vehicle as well as allowing for differing mirror support frame positions on the one side of the vehicle so as to allow for differences in drivers and/or vehicles. If the mirror 50 is attached to the vertical arm 52 of the mirror support frame 10 by any suitable means such as, for example, a clamp 54 having a ball joint 56 at the end thereof.

Turning now to FIG. 3, there is illustrated a second embodiment of smaller construction intended for use with smaller vehicles. Here, the mirror 250 is attached to the upper arm 220 of a mirror support frame 210. The construction of the lower attachment means 220 and mirror support spring 242 as those described above but the upper attachment means 221 comprises a substantially U-shaped bracket 232 adapted to receive the flattened portion 216 of the upper arm 220 of the mirror support frame 210 in pivotally secured relationship by the bolt 234 and is affixed directly to the vehicle 224 by means of bolts 230.

Due to its smaller relative size and thus smaller relative weight the one mirror support spring 242 would be adequate to perform the necessary functions.

While there has been described in the foregoing description a preferred construction of a mirror according to the present invention it will be understood by those skilled in the art that many modifications or variations in details in design or construction without departing from the scope of the invention, which is to be determined from the following claims.

What I claim is:

1. A vehicle mirror assembly comprising:
   a. a mirror and mirror support frame supporting said mirror,
   b. said support frame having an upper support arm and a lower support arm,
   c. upper and lower attachment means having a structural configuration effective to be secured to a vehicle,
   d. said upper support arm being pivotally connected to the upper attachment means and said lower support arm being pivotally connected to the lower attachment means, and
   e. a mirror support spring extending outwardly from one of the attachment means, said attachment means comprising an elongate member having a bracket pivotally connected to one of the support arms, said support spring having two ends connected to respective ends of the elongate member,
   f. said mirror support spring having at least one crimp therein to releasably engage the support arm at a location laterally displaced from the point the support arm is pivotally connected to the attachment means from which the support spring extends.

2. A mirror assembly as defined in claim 1 wherein the mirror support spring extends outwardly from the lower attachment means.

3. A mirror assembly as defined in claim 1 wherein said support frame has a vertical arm joining said upper arm of said lower arm, said mirror being connected to said vertical arm by means of a clamp and a ball joint.

4. A vehicle mirror assembly comprising:
   a. a mirror and mirror support frame supporting said mirror,
   b. said support frame having an upper support arm and a lower support arm,
   c. upper and lower attachment means having a structural configuration effective to be secured to a vehicle,
   d. said upper support arm being pivotally connected to the upper attachment means and said lower support arm being pivotally connected to the lower attachment means and
   e. a mirror support spring extending outwardly from one of the attachment means,
   f. said mirror support spring having at least one crimp therein to releasably restrain the support arm pivotally connected to the attachment means from which the support spring extends,
   g. said support spring is arcuate in shape and extends for approximately 180°,
   h. said support spring having a radially inwardly directed loop at each end thereof,
   i. each of said loops being receivable in a recess at each end of said lower attachment means.

5. A mirror assembly as defined in claim 4 wherein said upper attachment means is identical with said lower attachment means and a further said mirror support spring extends outwardly therefrom.

6. A mirror assembly as defined in claim 4 wherein said upper attachment means comprises an elongate member securable to said vehicle and an outwardly extending U-shaped bracket intermediate said elongate member for pivotally receiving said upper arm.

7. A vehicle mirror assembly comprising:
   a. a mirror support frame having an upper support arm, a lower support arm and a vertical arm joining said upper arm to said lower arm,
   b. an upper attachment means having a first elongate member attachable to a vehicle and an outstanding U-shaped bracket intermediate said first elongate member for pivotally receiving said upper arm,
   c. a lower attachment means having a second elongate member attachable to said vehicle, an outstanding U-shaped bracket intermediate said second elongate member for pivotally receiving said lower arm, and a recess at each end of said second elongate member,
   d. a mirror attachable to said mirror support frame by a clamp and a ball joint, and
   e. a mirror support spring in the form of an arc extending for approximately 180° and having a radially inwardly directed loop at each end thereof insertable in each said recess,
   f. a plurality of M or wave-shaped crimps disposed along the extent of said mirror support spring for releasably receiving said lower arm.

8. A mirror assembly as defined in claim 7 wherein said first elongate member has a further recess at each end thereof for receiving a second mirror support spring identical to said first mirror support spring and for supporting said upper arm.

9. A mirror assembly as defined in claim 7 wherein the mirror support frame is generally C-shaped and the upper and lower arms include flattened portions received by the respective U-shaped brackets on said elongate members.

* * * * *